United States Patent [19]
Mischutin et al.

[11] Patent Number: 5,540,762
[45] Date of Patent: Jul. 30, 1996

[54] FLAME RETARDANTS FOR LINSEED OIL FORMULATIONS AND APPLICATIONS

[76] Inventors: Vladimir Mischutin, 3 University Rd., East Brunswick, N.J. 08816; Carl J. Abraham, 3 Baker Hill Rd., Great Neck, N.Y. 11023

[21] Appl. No.: 372,493

[22] Filed: Jan. 13, 1995

[51] Int. Cl.$^6$ .............................. C09K 21/08; C09D 5/18; C09F 7/00

[52] U.S. Cl. ...................... 106/18; 106/18.11; 106/18.14; 106/18.18; 106/18.19; 106/18.2; 106/18.24; 106/252; 106/263; 252/601

[58] Field of Search .................................. 106/18, 18.11, 106/18.19, 18.24, 252, 18.18, 263, 18.14, 18.2; 252/601

[56] References Cited

U.S. PATENT DOCUMENTS

| | | | |
|---|---|---|---|
| 955,262 | 4/1910 | Gousseff | 106/18 |
| 2,536,978 | 1/1951 | Fordemwalt | 106/18.24 |
| 3,856,535 | 12/1974 | Ferguson | 106/18 |
| 4,566,994 | 1/1986 | Hasegawa et al. | 106/18.19 |
| 5,028,264 | 7/1991 | Miner | 106/252 |

FOREIGN PATENT DOCUMENTS

| | | | |
|---|---|---|---|
| 58-194952 | 11/1983 | Japan | 106/18.24 |
| 58-194951 | 11/1983 | Japan | 106/18 |
| 108226 | 8/1939 | United Kingdom | 106/18 |

OTHER PUBLICATIONS

Monsanto Technical Bulletin, "Phos–Check P/30—A Phosphorus–Based Fire Retardant . . . ", Bulletin No. IC/SCS–270, [No date].

Verburg et al, "Water–Resistant, Oil–Based, Intumsecing Fire Rertardant Coatings", Journal Of Paint Technology, vol. 38: No. 498, pp. 407–415 (Jul. 1966).

*Primary Examiner*—Anthony Green
*Attorney, Agent, or Firm*—Levine & Mandelbaum

[57] ABSTRACT

Formulations containing certain unsaturated drying oils, e.g., linseed oil, are rendered flame retardant by dissolving in them certain halogenated compounds which are solids at room temperature and soluble in linseed oil or other suitable solvents which can be added to the linseed oil formulations with phosphate-containing compounds added to enhance flame retardance. The resulting flame retardant system is achieved without adversely affecting the finish, coloration, transparency, or appearance of the formulation, its resistance to light or heat, or its durability.

16 Claims, No Drawings

FLAME RETARDANTS FOR LINSEED OIL FORMULATIONS AND APPLICATIONS

BACKGROUND OF THE INVENTION

This invention relates to fireproofing formulations. More specifically, the invention is directed to a composition of matter for preventing the spontaneous combustion of formulations containing certain unsaturated drying oils composed of glycerides of unsaturated acids, such as linolenic, oleic, linoleic acids, etc., for example, linseed oil, and applicators and other materials containing such formulations.

Linseed oil has been used for centuries as a drying oil for paints and varnishes. It is known that linseed oil can cause fires as a result of spontaneous combustion. During the polymerization process, when the oil oxidizes in air, sufficient heat is liberated to ignite the applicator used to apply the linseed oil formulation. This has resulted in millions of dollars of serious property damage annually, not to mention personal injury and loss of life.

It is also known in the art that certain halogenated compounds have flame retardant properties and that phosphorus compounds act as synergists when included in flame retardants with halogenated compounds. However, until the instant invention, it was not known that such flame retardants can be dissolved in a linseed oil formulation to prevent spontaneous combustion without seriously degrading the properties of the formulation, or otherwise rendering the formulation unsuitable for its intended purpose.

SUMMARY OF THE INVENTION

The aforementioned problems of the prior art are overcome by the instant invention which provides for the addition of flame retardant halogenated compounds to a linseed oil formulation to render it combustion resistant and the further addition of phosphorous compounds to enhanced the flame retardant properties of the halogenated compounds while preserving the physical properties of the formulation on which its functionality depends. More specifically, the invention teaches a combustion resistant composition of matter and a method of making said combustion resistant composition of matter for preventing the spontaneous combustion of formulations containing certain unsaturated drying oils composed of glycerides of unsaturated acids, such as linolenic, oleic, linoleic acids, etc., for example, linseed oil, and applicators and other materials containing such formulations, which formulation is not adversely affected.

It is, therefore, an object of the invention to provide formulations of linseed and similar drying oils which are flame retardant to prevent spontaneous ignition in linseed oil formulations.

Another object of the invention is to provide a formulation of linseed and similar drying oils which are flame retardant to prevent spontaneous ignition in linseed oil formulations without making the formulations brittle, tacky or stiff.

Still another object of the invention is to provide formulations of linseed and similar drying which are flame retardant to prevent spontaneous ignition in linseed oil formulations without adversely affecting the coloration, transparency or appearance of the formulations.

A further object of the invention is to provide formulations of linseed and similar drying which are flame retardant to prevent spontaneous ignition in linseed oil formulations without adversely affecting the resistance of the formulations to light or heat, or their durability.

Still a further object of the invention is to provide formulations of linseed and similar drying oils which can render structures to which they are applied flame retardant.

Other and further objects of the invention will be apparent from the following description of a preferred embodiment of the invention.

DESCRIPTION OF THE PREFERRED EMBODIMENT

Flame retardants are widely employed to produce self-extinguishing polymeric materials such as those used in plastics, textiles, paper and the like. These materials are normally based on the elements chlorine, bromine, phosphorus, boron, sulfur, nitrogen and antimony, individually or in combination with each other. They are classified in two groups: solid state and vapor phase flame retardants.

The solid state flame retardants are based on the elements of phosphorus, boron, and sulfur. They owe their effectiveness to the fact that, at the flaming temperatures, they release their respective acids which, when combined with reactive sites on the substrate, primarily hydroxyl groups, form stable esters that do not decompose and, therefore, do not burn.

The vapor phase flame retardants, based on compounds containing the elements chlorine and bromine, with or without antimony oxide, decompose during the combustion process and form heavy gases which displace oxygen from the burning area and extinguish the flame by snuffing it.

The active flame retarding agents employed in accordance with the invention are chlorinated or brominated organic compounds which are solids at room temperature and soluble in linseed oil or other suitable solvents which can be added to linseed oil or formulations containing linseed oil. The halogenated solid organic compounds can be used alone or in combination with other solid flame retardants containing the elements phosphorus or boron which are also soluble in the linseed oil, or solvents, and act as synergists.

The proper selection of the flame retardant system will not affect the finish, coloration, transparency, or appearance of the substrate, its resistance to light or heat, or its durability.

Flame retarding materials are commercially available in a variety of forms with different physical and chemical properties. Some of them are reactive in nature, while others are additive. They can be found as high boiling liquids or heat stable solids.

It is widely known that the addition of flame retardants to any material may adversely affect its physical properties. Some flame retardants make materials brittle, tacky or stiff. Others have a marked effect on the coloration, transparency or appearance of the substrate of the material, its resistance to light or heat, its durability, etc. Therefore, it is very important to select flame retardants in such a way that they will not affect the properties of the products to such a degree as to make them unstable.

This is also the case with formulations containing unsaturated drying oils composed of glycerides of unsaturated acids, such as linolenic, oleic, linoleic acids, etc., for example, linseed oil. Although the invention is hereinafter described with reference to linseed oil, it is to be understood that it is equally applicable to other unsaturated drying oils composed of glycerides of unsaturated acids, such as linolenic, oleic, and linoleic acids.

The addition of a liquid flame retardant to a formulation containing linseed oil which is to be applied as a coating causes the coating to become tacky. A solid material, which is not soluble in the formulation, makes it opaque. A reactive material may affect the drying properties of the oil. Materials with poor light stability may degrade upon lengthy exposure to sunlight and cause the coating to fail.

In view of the foregoing, to prevent spontaneous combustion of linseed oil formulations, one must use flame retardant materials which are additive in nature, and soluble in linseed oil or a low boiling point solvent compatible with the oil. Of foremost importance, the flame retardant materials must form clear films which will not affect the transparency of the linseed oil formulation.

In paint formulations, transparency may not be a factor. Since linseed oil does not have reactive hydroxyl groups, the flame retardant employed must be of the vapor phased variety. Hence, halogenated materials are the flame retardants of choice for paint formulations containing linseed oil.

As a general rule, the element bromine is two or three times more effective than chlorine in flame retardant applications. Therefore, a brominated material is normally preferred since lesser amounts will be required to achieve flame retardancy. However, in some cases, economic considerations may dictate the use of chlorinated flame retardants. In addition, it is known that aliphatic halogenated materials have much better stability when subjected to light that their aromatic counterparts.

There are a number of commercially available flame retardant compounds which meet most or all of the foregoing requirements. They include, without limitation, the following:

Hexabromocyclododecane

Tris-dibromophenyl Phosphate

Tris-tribromoneopentyl Phosphate

Solid chlorinated Paraffins

Dibromo neopentyl Glycol

Tribromo neopentyl Alcohol, and

Tetrabromo Bisphenol A.

Furthermore, it is also known to those skilled in the art that phosphorus compounds act as synergists when included in flame retardants with halogenated compounds. Therefore, the amounts of flame retardants can be somewhat reduced if the halogenated material is used in conjunction with a suitable phosphorus compound. The above mentioned phosphates already contain phosphorus. However, the effectiveness of the remaining retardants can be considerably improved by adding an external source of phosphorus. The most suitable phosphorus donor for this application has been found to be triphenyl phosphate.

Experiments conducted in order to confirm the effectiveness of the aforementioned compounds as constituents of a flame retardant linseed oil formulation, are described in the following examples.

EXAMPLE I

To a commercially available linseed oil varnish, 5 parts by weight of Hexabromocyclododecane was added. The resulting mixture was stirred with a mechanical agitator until a clear solution was obtained.

Several applicator cloths made of cotton fabric were thereafter impregnated with the solution. The impregnated cloths were then squeezed to remove excess solution. Finally, the cloths were placed in a pile and left there for observation. After three weeks, the cloths impregnated with the varnish containing the flame retardant had not ignited.

The same process was repeated with untreated linseed oil. Within four to eight hours after the cotton applicator cloths were placed in a pile, spontaneous combustion occurred and the applicators ignited.

EXAMPLE II

To the linseed oil varnish of Example I, 3 parts by weight of Hexabromocyclododecane and 1.5 parts by weight of Triphenyl Phosphate were added. The mixture was agitated until a clear solution was obtained.

Six cotton applicator cloths were then treated as in Example I. That is, the cloths were impregnated with the varnish solution and excess solution was removed by squeezing. Three weeks after the cloths were left in a pile, no ignition of the fabric had occurred.

EXAMPLE III 50 parts by weight of Tris-dibromophenyl Phosphate were dissolved in 50 parts of Methylene Chloride. 50 parts of the resulting solution were then mixed with the same linseed oil varnish as used in Example I. A piece of newspaper was impregnated with the varnish thus prepared and left to air dry until completely tack free.

The paper thus impregnated was thereafter ignited with a butane lighter. The paper ignited but the fire was extinguished after removal of the flame from the lighter.

Hence it is seen that formulations of linseed and similar oils, when mixed in solution with the flame retardants herein disclosed, are rendered flame retardant. From the foregoing, it also is seen that structures can be rendered flame retardant upon application to them of the formulations herein described.

It is to be appreciated that the foregoing is a description of a preferred embodiment of the invention to which variations and modifications may be made without departing from the spirit and scope of the invention.

What is claimed is:

1. A method of preventing spontaneous combustion of a transparent composition containing unsaturated drying oil including a glyceride of an unsaturated acid comprising, dissolving in said composition 3 to 50 parts by weight of a halogenated organic compound which is solid at room temperature and soluble in said composition to form a transparent flame resistant solution.

2. A method of preventing spontaneous combustion of a composition containing unsaturated drying oil in accordance with claim 1 further comprising dissolving said halogenated compound in an organic solvent which is soluble in unsaturated drying oil and then mixing the solvent, in which the halogenated compound is dissolved, with the unsaturated drying oil.

3. A method of preventing spontaneous combustion of a composition containing unsaturated drying oil in accordance with claim 1 wherein said halogenated compound is an organic brominated compound.

4. A method of preventing spontaneous combustion of a composition containing unsaturated drying oil in accordance with claim 1 wherein said halogenated compound is an organic chlorinated compound.

5. A method of preventing spontaneous combustion of a composition containing unsaturated drying oil in accordance with claim 1 wherein said halogenated compound is selected from the group consisting of Hexabromocyclododecane, Tris-dibromophenyl Phosphate, Tris-tribromoneopentyl Phosphate, Solid chlorinated Paraffins, Dibromo neopentyl Glycol, Tribromo neopentyl Alcohol, and Tetrabromo Bisphenol A.

6. A method of preventing spontaneous combustion of a composition containing unsaturated drying oil in accordance with claim 1 further comprising adding 1.5 to 50 parts by weight of a phosphorus-containing compound to said composition.

7. A method of preventing spontaneous combustion of a composition containing unsaturated drying oil in accordance with claim 6 wherein the phosphorus containing compound is Triphenyl Phosphate.

8. A method of reducing the flammability of a structure coated with a composition containing a transparent unsaturated drying oil including a glyceride of an unsaturated acid comprising dissolving in said composition 3 to 50 parts by weight of an organic halogenated compound solid at room temperature before applying said composition to said structure.

9. A combustion resistant composition of matter consisting of unsaturated drying oil including a glyceride of an unsaturated acid and 3 to 50 parts by weight of an organic halogenated compound dissolved therein, said halogenated compound being solid at room temperature.

10. A combustion resistant composition of matter in accordance with claim 9 wherein said halogenated compound is an organic brominated compound.

11. A combustion resistant composition of matter in accordance with claim 9 wherein said halogenated compound is an organic chlorinated compound.

12. A combustion resistant composition of matter in accordance with claim 9 wherein said halogenated compound is selected from the group consisting of Hexabromocyclododecane, Tris-dibromophenyl Phosphate, Tris-tribromoneopentyl Phosphate, Solid chlorinated Paraffins, Dibromo neopentyl Glycol, Tribromo neopentyl Alcohol, and Tetrabromo Bisphenol A.

13. A combustion resistant composition of matter consisting of unsaturated drying oil including a glyceride of an unsaturated acid, 3 to 50 parts by weight of an organic halogenated compound dissolved therein, and an organic solvent which is soluble in said unsaturated drying oil, said halogenated compound being solid at room temperature and soluble in said solvent.

14. A combustion resistant composition of matter consisting of unsaturated drying oil including a glyceride of an unsaturated acid, 3 to 50 parts by weight of an organic halogenated compound dissolved therein, and 1.5 to 50 parts by weight of a phosphorus containing compound, said halogenated compound being solid at room temperature.

15. A combustion resistant composition of matter in accordance with claim 14 wherein said halogenated compound is selected from the group consisting of Hexabromocyclododecane, Trisdibromophenyl Phosphate, Tris-tribromoneopentyl Phosphate, Solid chlorinated paraffins, Dibromo neopentyl Glycol, Tribromo neopentyl Alcohol, and Tetrabromo Bisphenol A.

16. A combustion resistant composition of matter in accordance with claim 15 wherein said phosphorus containing compound is Triphenyl Phosphate.

* * * * *